United States Patent [19]

Hagiuda et al.

[11] Patent Number: 5,075,714

[45] Date of Patent: Dec. 24, 1991

[54] ELECTRONIC FLASH APPARATUS

[75] Inventors: Nobuyoshi Hagiuda, Kawasaki; Hideki Matsui, Yokohama; Norikazu Yokonuma, Tokyo; Yoshikazu Iida, Chigasaki; Hiroshi Sakamoto, Kawasaki, all of Japan

[73] Assignee: Nikon Corporation, Tokyo, Japan

[21] Appl. No.: 652,356

[22] Filed: Feb. 6, 1991

Related U.S. Application Data

[63] Continuation of Ser. No. 446,421, Dec. 5, 1989, abandoned.

[30] Foreign Application Priority Data

Dec. 9, 1988 [JP] Japan .......................... 63-160244[U]
Dec. 9, 1988 [JP] Japan .......................... 63-311596
Dec. 9, 1988 [JP] Japan .......................... 63-311598

[51] Int. Cl.[5] .............................................. G03B 15/05
[52] U.S. Cl. .................................. 354/416; 354/145.1
[58] Field of Search ............ 354/413, 416, 417, 145.1, 354/149.1

[56] References Cited

U.S. PATENT DOCUMENTS 4,839,686 6/1989 Hosomizu et al. .................. 354/416
4,935,759 6/1990 Tsuji ................................. 354/149.1

FOREIGN PATENT DOCUMENTS 49-39416 10/1974 Japan .
57-29520 6/1982 Japan .
58-197694 11/1983 Japan .
58-197695 11/1983 Japan .
61-50125 3/1986 Japan .
61-50126 3/1986 Japan .
63-129327 6/1988 Japan .

*Primary Examiner*—Russell E. Adams
*Attorney, Agent, or Firm*—Shapiro and Shapiro

[57] ABSTRACT

An electronic flash apparatus uses a voltage-controlled switching device, such as an insulated gate bipolar transistor, for controlling the start and termination of flash emission from a flash discharge tube. A peak voltage of an oscillation generated in a resonant circuit, produced in response to a flash emission start command, is clamped by a clamping circuit and is used to turn on the voltage-controlled switching device. Another resonant circuit may be used for doubling the voltage between the anode and cathode of the flash discharge tube when the flash discharge tube is triggered.

10 Claims, 7 Drawing Sheets

ELECTRONIC FLASH APPARATUS

This is a continuation of application Ser. No. 446,421 filed Dec. 5, 1989, now abandoned.

BACKGROUND OF THE INVENTION

1. Field of the Invention

The present invention relates to an electronic flash apparatus utilizing, as a switching device for controlling start and termination of flash emission of a flash discharge tube, a voltage-controlled switching device such as an insulated gate bipolar transistor (IGBT).

2. Related Background Art

In the conventional electronic flash apparatus, a thyristor is usually connected serially with the flash discharge tube. However, in the use of such thyristor, there is required a known current diverting circuit for terminating the flash emission of the flash discharge tube, giving rise to drawbacks of an increased cost and an increase space required for current diverting circuit.

For avoiding such drawbacks, it has been proposed to replace the thyristor with a gate turn-off switching device as disclosed in the Japanese Pat. Publication No. Sho49-39416, or with a large-current bipolar transistor as disclosed in the Japanese Laid-open Pat. Nos. Sho58-197694 or Sho58-197695. However these devices are not employed in practice, since these devices are bulky and difficult to incorporate. Also the,-Japanese, Laid-open Pat. Nos. Sho61-50125 and Sho61-50126 propose the use of a large field effect transistor (FET), which is a voltage-controlled device, for controlling the flash emission current, but such device is not employed in practice due to a large loss in the FET.

The recently developed insulated gate bipolar transistor (IGBT) has started to be utilized as the light emission controlling switching device (hereinafter called flash emission control device) of the electronic flash apparatus. The IGBT is a voltage-controlled three-terminal switching device having a gate, a collector and an emitter, in which the conduction between the collector and the emitter can be controlled by a voltage applied between the gate and the emitter, and is characterized by a low loss in contrast to an FET.

The IGBT can be rendered conductive usually by applying a voltage of 20–40 V to the gate (control terminal) while the emitter is maintained at the ground potential, and rendered nonconductive by maintaining the gate and the emitter at a same potential. The power supply voltage (3 to 12 V in ordinary electronic flash units) is too low on-off control of the IGBT, but the voltage of the main capacitor for charge accumulation for the flash discharge tube (usually 200–500 V) is too high for the drive voltage for supply to the control terminal for on-off control of the IGBT. For this reason there is required a separate power source for controlling the IGBT, thus giving rise to the drawbacks of increased cost and therefor.

The Japanese Utility Model Publication Sho57-29520 proposes to facilitate the triggering of flash emission in the conventional electronic flash apparatus, by applying a voltage of about twice of that the main capacitor, between the anode and cathode of the flash discharge tube. The apparatus employs a thyristor as the flash emission control device, and the doubled voltage is obtained by applying the negative potential of the main capacitor to the cathode of the flash discharge tube.

It is conceivable to secure the necessary voltage by forming an intermediate tap in the secondary coil of the transformer of the DC-DC converter for charging the main capacitor, as in the apparatus employing an FET as the flash control device as disclosed in the Japanese Laid-open Pat. No. Sho61-50125 or Sho61-50126, or the apparatus employing a bipolar transistor as the flash control device as disclosed in the-Japanese Laid-open Pat. No. Sho58-197695 or Sho61-50125. However, since the voltage from the intermediate tap fluctuates when the voltage of the main capacitor constituting the load of the DC-DC converter drops immediately after the flash emission, it may become impossible to obtain the necessary voltage if the next flash emission is needed immediately. Also, in a flash apparatus in which the function of the DC-DC converter is stopped after the main capacitor is charged to a predetermined voltage, thereby eliminating the idling current of the DC-DC converter for energy economization, the necessary voltage cannot be obtained from the intermediate tap of the secondary coil when the function of the DC-DC converter is stopped.

Such drawback exists also in a structure, disclosed in the Japanese Laid-open Pat. No. Sho63-129327, FIG. 4, in which a coil is added to the transformer of the DC-DC converter.

It is also conceivable to activate the DC-DC converter in response to the flash start instruction, but the start of flash emission is delayed because the DC-DC converter has a relatively low oscillating frequency at the start of oscillation, thus requiring time for providing a sufficiently high voltage. Consequently, in case of synchronization with a focal plane shutter of a high shutter speed such as 1/250 sec., there may result an uneven exposure because the trailing shutter curtain starts to run before the termination of flash emission due to the above-mentioned delay.

When the IGBT is employed as the flash control device, the double method voltage method disclosed in the Japanese Utility Model Publication Sho57-29520 cannot be utilized as it cannot apply the negative potential to the collector of the IGBT, so that the IGBT is inferior in flash triggering to the thyristor.

SUMMARY OF THE INVENTION

In consideration of the foregoing, an object of the present invention is to provide an electronic flash apparatus capable of obtaining a driving voltage for a voltage-controlled switching device for flash emission control, such as IGBT, by a simple circuit structure without requiring a particular driving circuit.

Another object of the present invention is to provide an electronic flash apparatus utilizing a voltage-controlled flash control device, capable of applying a voltage of about twice of that the main capacitor, between the anode and cathode the flash discharge tube.

In one embodiment, (e.g., as shown in FIG. 1) the present invention is applied to an electronic flash apparatus provided with a flash discharge tube Xe connected between a power supply line l1 and a ground line l2; a main capacitor C1 charged by a power source 1 and accumulating a charge for causing flash emission in the flash discharge tube Xe; a trigger circuit TC provided with a trigger capacitor C2 to be charged by the power source 1 and a trigger transformer T1 and serving to supply the flash discharge tube Xe with a trigger voltage; a first switching device SCR for instructing start of flash emission; and a second switching device Q1 for passing or intercepting the discharge current in the flash discharge tube Xe.

The above-mentioned objects can be attained by the following structure.

The second switching device is composed of a voltage-controlled switching device which is on-off controlled by a voltage applied to a control terminal, such as an insulated gate bipolar transistor. Also there is provided a control voltage generating circuit, including a clamping circuit CC, for clamping an output voltage of the first switching device SCR responding to the flash emission start command at a value suitable as the control voltage for the second switching device Ql. Furthermore the output voltage of said clamping circuit CC is supplied to the control terminal of the second switching device Q1. In the above-explained structure of the present invention, the output voltage of the first switching device SCR, responding to the flash emission start command, is converted by the clamping circuit CC to a control voltage suitable for the second switching device Q1. The control voltage is supplied to the control terminal of a voltage-controlled switching device Ql, for example an insulated gate bipolar transistor (IGBT), thereby rendering said switching device Ql conductive, and initiating the flash emission of the flash discharge tube Xe. Also the flash emission of the flash discharge tube Xe is terminated by shifting the control voltage to zero thereby rendering the second switching device Ql non-conductive.

Further objects, features and advantages of the present invention will become fully apparent from the following description of the preferred embodiments of the present invention, to be taken in conjunction with the accompanying drawings.

DESCRIPTION OF THE PREFERRED EMBODIMENTS

At first there will be explained a first embodiment of the electronic flash apparatus of the present invention, with reference to FIGS. 1 and 2.

Figure 1:
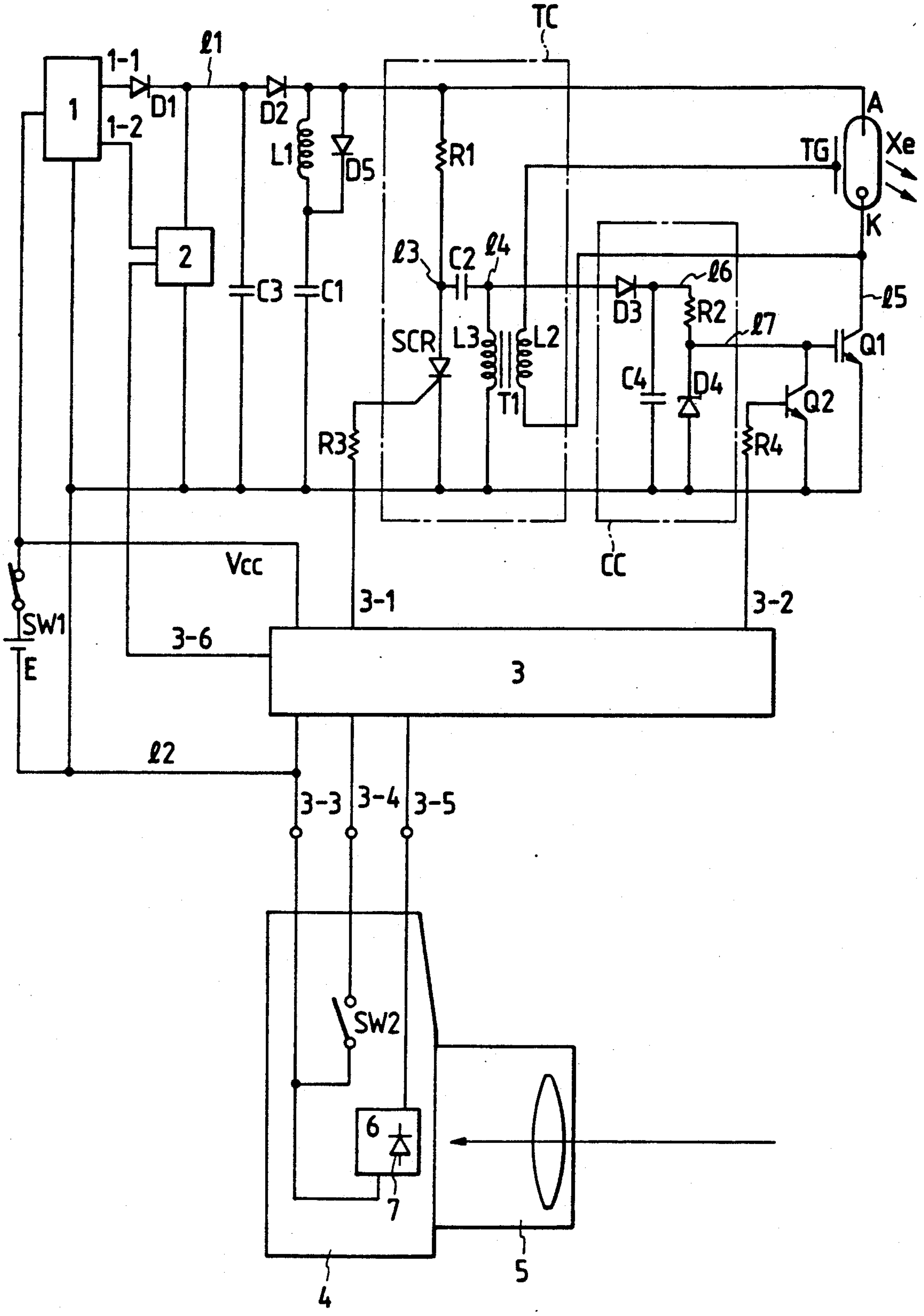
FIG. 1 is a circuit diagram of a first embodiment of the present invention.

Referring to FIG. 1 there are provided a low-voltage power source E composed for example of a battery, a power switch SW1 and a DC-DC converter 1. When the power switch SW1 is closed, the DC-DC converter 1 starts the voltage elevating function, and the high-voltage output thereof is supplied, through diodes D1, D2 and an inductor L1, to a main capacitor Cl, thereby charging the energy for flash emission therein. Also a capacitor C3 of smaller capacity is charged.

A charged voltage detecting circuit 2, upon detecting that the voltage between a power supply line 11 and a ground line 12 reaches a predetermined voltage $V_{CM}$, sends an instruction to an input terminal 1-2 of the DC-DC converter 1 for terminating the voltage elevating function thereof. Also after the lapse of a predetermined time from the completion of charging, the charged voltage detecting circuit 2 periodically reactivates the DC-DC converter 1, thereby maintaining the main capacitor C1 at a constant charged voltage $V_{CM}$. In the stand-by state, circuits connected parallel to the main capacitor do not have any DC discharge loop, so that the charge in the main capacitor C1 is retained for a long period.

Between a power supply line 11 and a ground line 12 there is connected a flash discharge tube Xe, serially with an insulated gate bipolar transistor Ql constituting the second switching device and serving as a voltage-controlled switching device.

The trigger circuit TC is composed of a resistor R1, a trigger capacitor C2, a first switching device composed of a thyristor SCR, and a trigger transformer T1, wherein the ends of the secondary coil L2 of said trigger transformer T1 are respectively connected to a trigger electrode TG and a cathode K of the flash discharge tube Xe. The trigger capacitor C2 is charged in advance by a loop circuit composed of the positive electrode of the main capacitor Cl, resistor R1, trigger capacitor C2, primary coil L3 of the trigger transformer T1 and the negative electrode of the main capacitor C1.

A clamping circuit CC is composed of a diode D3, a capacitor C4, a resistor R2 and a Zener diode D4 and is connected to the trigger capacitor C2 and the primary coil L3 of the trigger transformer T1, wherein the peak value of output voltage of an LC resonance circuit is supplied through the diode D3 and is retained by the capacitor C4, and is clamped by the Zener diode D4 at a predetermined value, for example 40 V. The clamped voltage is supplied to the gate of the IGBT Ql.

An interface circuit 3 for interfacing with a TTL camera 4 receives various signals from the camera 4 through input terminals 3-3 - 3-5 in relation to the shutter releasing operation of the camera 4, and releases various signals through output terminals 3-1, 3-2 and 3-6. The terminal 3-1 releases a signal for instructing the start of flash emission; terminal 302 releases a signal for instructing the termination of flash emission; and terminal 3-6 releases a signal for re-starting the voltage elevating function of the DC-DC converter 1 through the charged voltage detecting circuit 2.

When the shutter is released in the camera 4 capable of TTL light control, a synchronization switch SW2 is closed to sends a flash emission start signal to the terminal 3-4 of the electronic flash apparatus. Then the reflected light from the object, illuminated by the flash emission from the electronic flash apparatus, is transmitted by a photographing lens 5 and measured by a photosensor 7 in a light metering circuit 6, and a flash emission terminating signal is sent to the terminal 3-5 when a predetermined amount of light is reached.

In response to the flash emission start signal from the terminal 3-4, the interface circuit 3 shifts the output signal 3-2 from the high level to the low level and shifts the output signal 3-1 to the high level, thereby shifting the gate of the thyristor SCR (first switching device) of the trigger circuit TC to the high level through the resistor R3 and rendering the thyristor conductive. Also in response to the flash emission terminating signal from the terminal 3-5, the interface circuit 3 shifts the output 3-2 to the high level, thereby injecting a current to the base of the flash emission terminating transistor Q2 through the resistor R4 and rendering transistor Q2 conductive. Thus the gate of the IGBT Ql is shifted to the low level, whereby IGBT Ql is rendered non-conductive and the flash emission is terminated.

Figure 2:
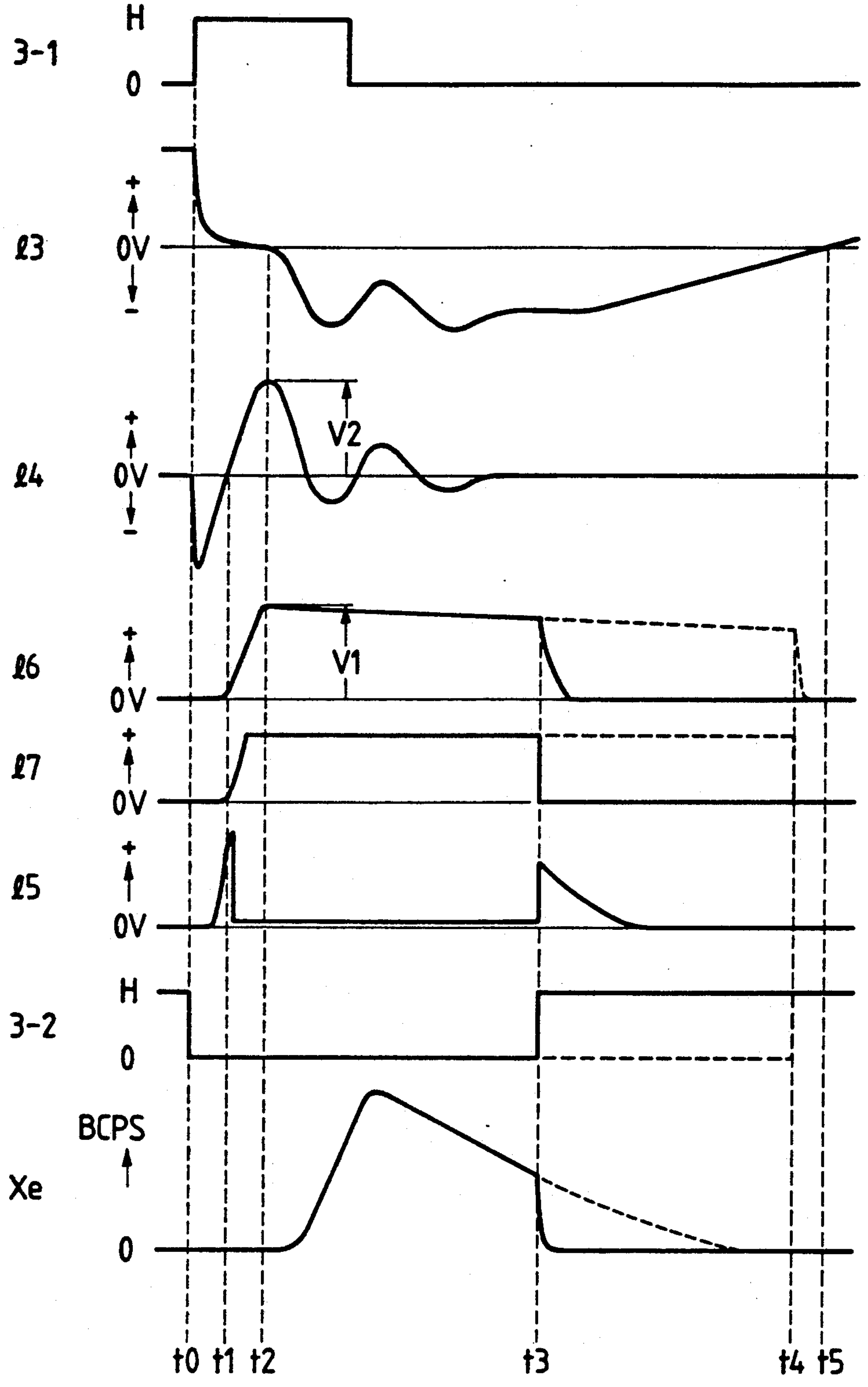
FIG. 2 is a timing chart of the first embodiment.

Now reference is made to a timing chart shown in FIG. 2, for explaining the flash emitting operation. It is assumed that the main capacitor C1 and the trigger capacitor C2 are charged in advance.

When the output 3-1 (FIG. 2) of the interface circuit 3 is shifted to the high level at a time t0, the thyristor SCR is rendered conductive to initiate a rapid discharge of the trigger capacitor C2 (l3 in FIGS. 1 and 2). The discharge current of the trigger capacitor C2 flows in a loop circuit containing the thyristor SCR and the primary coil L3 of the trigger transformer T1, whereby an LC resonance circuit composed of the primary coil L3 and the trigger capacitor C2 initiates an attenuating oscillation (l4 in FIGS. 1 and 2) with a frequency:

$$f = \frac{1}{2\pi\sqrt{L3 \times C2}}$$

wherein L3 is the inductance of primary coil L3 of trigger transformer T1; and C2 is the capacity of trigger capacitor C2. The thyristor SCR turned on at the time t0 remains conductive during a half period until a time t2 when the voltage of the point l3 becomes negative ($t2-t0=\pi\sqrt{L3\times C2}$, and is thereafter turned off the anode potential (l3 in FIG. 1) assuming an approximate value of $-V_{CM}$. In the discharge cycle from t0 to t1, a high voltage of several kilovolts is generated in the secondary coil L2 of the trigger transformer T1, thereby triggering the discharge in the flash discharge tube Xe through the trigger electrode TG. However, since the IGBT Ql is still turned off in this state, the flash discharge tube Xe does not start the flash emission. Instead the resistance between the anode and cathode of the flash discharge tube Xe decreases to initiate conduction therebetween. Thus a small current starts to flow and the potential at l5 is elevated (l5 in FIGS. 1 and 2).

The potential at the point l4 starts from $-V_{CM}$ at t0 ($V_{CM}$ being the charged voltage of the main capacitor Cl), then reaches approximately $V_{CM}$ at t2, and thereafter repeats attenuating oscillation. The voltage appearing at point l4 is subjected to peak holding in the capacitor C4 through the diode D3, and the voltage V1 at a point l6 becomes close to the voltage V2 at the point l4. In the experience of the present inventors, V1 can be made as high as $\frac{1}{2}V_{CM}$ to $\frac{2}{3}V_{CM}$.

Thus the capacitor C4 is charged in a period from t1 to t2. The charge in capacitor C4 flows to the Zener diode D4 through the resistor R2, thereby generating a Zener voltage of several tens of volts at a point l7 at the cathode of said zener diode D4, as shown by l7 in FIG. 2. The IGBT Ql is rendered conductive by the Zener voltage applied to the gate thereof. Consequently the IGBT Ql remains conductive in the period from t1 to t2.

Since the flash discharge tube Xe is triggered in the period t0−t1, the voltage at the point l5, indicating the cathode potential of the tube Xe, has started to rise. When the IGBT Ql is made conductive by the voltage generated at the point l7, the voltage at the point l5 is reduced in the period t1−t2 shown in FIG. 2. When the IGBT Ql and the flash discharge tube Xe are rendered conductive in this manner, the impedance of rare gas in tube Xe is rapidly decreased, whereby the flash emission by discharge is initiated in a period t2−t3 shown in FIG. 2 (cf. Xe in FIG. 2).

When the output 3-2 of the interface circuit 3 is shifted to the high level by the flash emission terminating signal at a time t3, the transistor Q2 is rendered conductive to reduce the Zener voltage, or the gate voltage of the IGBT Ql, to zero, whereby the IGBT Ql is immediately turned off and the flash discharge tube Xe terminates the flash emission, due to the interruption of the discharge loop. The cathode voltage of the tube Xe rises momentarily as the IGBT Ql is turned off. The charge of the capacitor C4 is also discharged through the resistor R2 and the transistor Q2. When the flash emission is complete, as indicated by broken lines in FIG. 2, the output 3-2 of the interface circuit 3 remains at to the high level, at a time t4 when the charge of the main capacitor C1 is almost fully discharged, thereby keeping on the transistor Q2 and thus reducing the gate voltage of the IGBT Ql to zero, in order to avoid unexpected activation of the IGBT Ql for example by noise. It is therefore possible to prevent weak continuous light emission from the tube Xe by the current supplied from the DC-DC converter 1.

In FIG. 2, starting from t0, t1 is about 1 μsec., t2 is about 2 μsec., t3 is several tens of microseconds to several milliseconds, and t4 is about 10 msec.

The inductor L1 is provided for preventing abrupt rise of the current in the flash discharge tube Xe and the IGBT Ql, thereby protecting the IGBT Ql from surge current, and to suppress the upshift of flash emission, thereby improving the light control characteristics. The diode D5 is provided for protecting the IGBT Ql from the inverse voltage generated by the inductor Ll at the termination of flash emission.

Further referring to FIG. 2, at a time t5 after the light control function of the electronic flash apparatus, the anode voltage of the thyristor SCR at point l3 moves from a negative voltage to a positive voltage. At this point, if the gate voltage of the thyristor SCR is at the high level while the main capacitor C1 has a high remaining voltage and if the resistance of the resistor R1 is low (in case the interface circuit 3 maintains the flash emission start signal 3-1 in the full flash emission state), the thyristor SCR is given a current exceeding the holding current and remains in the conductive state, so that repeated flash emission cannot be achieved. In order to prevent such drawback, it is necessary to shift the flash emission start signal to the low level prior to the time t5 when the anode voltage of the thyristor SCR shifts to positive.

The time (t5−t0) required by the anode voltage at the point l3 to reach a positive value can be determined as follows $$t5 - t0 = C2 \cdot R1 \cdot \ln\frac{2V_{CM}}{V_{CM}} = C2 \cdot R1 \cdot \ln 2$$

wherein

C2 : capacity of trigger capacitor C2

R1 : resistance of resistor R1.

For example, in case C2 = 0.047 μF and R1 = 100 KΩ, the period t5−t0 is about 3.26 msec. Consequently the flash emission start signal should be shifted down prior to the lapse of 3.26 msec. after the start of flash emission at t0. This is not a practical problem since the flash emission start signal is only needed for several tens of microseconds. Also if C2 and R1 are selected as mentioned above, repeated triggerings as fast as about 100 Hz are possible.

In the above-explained first embodiment, in using the insulated gate bipolar transistor Ql as the flash emission switching-device for the flash discharge tube Xe, the voltage oscillation in an LC resonance circuit composed of the trigger capacitor C2 and the primary coil L3 of the trigger transformer T1 constituting the trigger circuit TC is clamped by the clamping circuit CC, and a voltage of several tens of volts is supplied to the gate of IGBT Ql. Consequently it is possible to dispense with a separate medium voltage source and to save the space therefor. Also there is no delay in the timing of flash emission. Furthermore, though the trigger capacitor C2 and the primary coil L3 of the trigger transformer are connected to the main capacitor Cl, they constitute a circuit without discharge loop, since they have infinite DC impedance in the stand-by state. Also the flash emission is possible even when the DC-DC converter 1 is not operating, so that the present invention is applicable also to an electronic flash apparatus of the power economization type.

Figure 3:
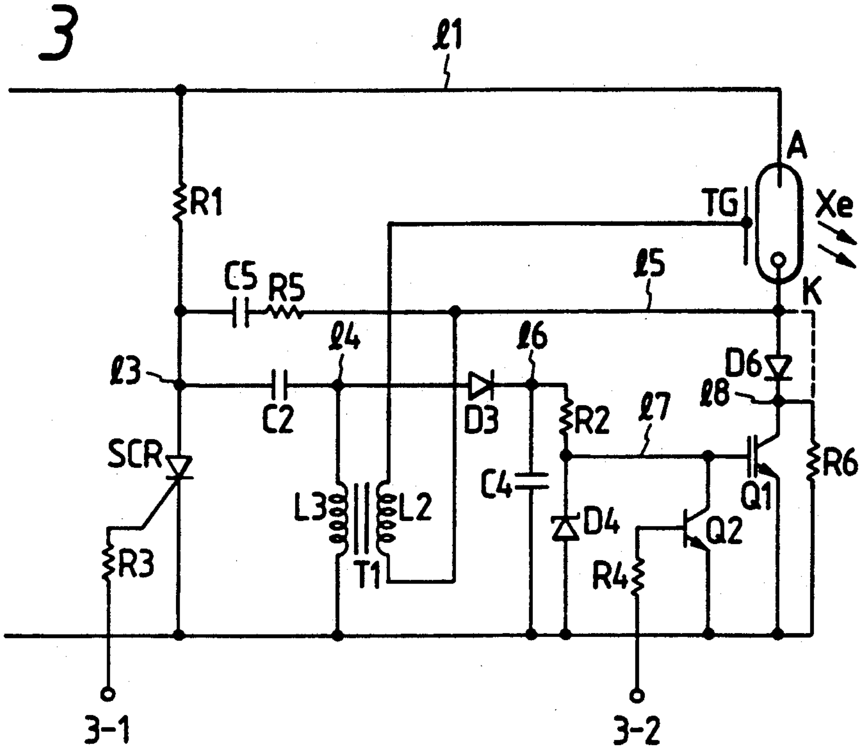
FIG. 3 is a circuit diagram of a second embodiment of the present invention.

FIG. 3 shows a second embodiment of the present invention, wherein the camera 4, photographing lens 5, power source E, DC-DC converter 1, charged voltage detecting circuit 2, interface circuit 3, main capacitor 1 etc. are the same as those in the first embodiment and are omitted from the drawing. Also the same or similar parts as in FIG. 1 are represented by the same numbers or symbols, and the differences in the second embodiment will be explained in the following with reference to FIGS. 3 and 4.

In the second embodiment, a diode D6 is inserted between the flash discharge tube Xe and the IGBT Ql, in order to apply, at triggering of the flash emission, a voltage that is double the charged voltage $V_{CM}$ of the main capacitor C1 between the anode and cathode of the flash discharge tube Xe.

Between the anode of the thyristor SCR and the cathode of the flash discharge tube Xe, there are serially connected a voltage doubling capacitor C5 and a current limiting resistor R5. The voltage doubling capacitor C5 is charged in advance to a voltage $V_{CM}$, through a circuit composed of the main capacitor Cl, resistor R1, voltage doubling capacitor C5, resistor R5, diode R6 and resistor R6. When the high-level flash emission start signal is supplied to the gate of the thyristor SCR at t0, the thyristor SCR is rendered conductive, whereby the anode potential thereof at 13 varies from $V_{CM}$ to a low level (13 in FIG. 4). Consequently, the potential at the opposite side of the voltage doubling capacitor C5, namely the potential at the cathode K of the flash discharge tube Xe varies from zero to $-V_{CM}$ (15 in FIG. 4). Thus, at t1, a voltage of $2 \times V_{CM}$ is applied between the anode and cathode of the flash discharge tube Xe.

As already explained in relation to FIG. 1, the trigger voltage is applied to the trigger electrode of the flash discharge tube Xe in the period $t0-t1$, so that a starting current of the discharge starts to flow between the anode and cathode of the tube Xe. The starting current flows in a circuit consisting of the positive electrode of the main capacitor Cl, flash discharge tube Xe, resistor R5, voltage doubling capacitor C5, thyristor SCR and negative electrode of the main capacitor Cl. In the period $t1-t2$, the gate potential of the IGBT Ql, or the potential at 17, assumes the high level state as explained before, whereby the IGBT Ql is rendered conductive. Thus the flash emission current flows in a circuit consisting of the positive electrode of the main capacitor Cl, flash discharge tube Xe, diode D6, IGBT Ql, and negative electrode of the main capacitor Cl, thereby causing flash emission from the flash discharge tube Xe. The flash emission current starts to flow through the IGBT Ql after the lapse of several tens of microseconds from the time t0. It is therefore necessary to maintain the conductive state of the thyristor SCR thereby maintaining the effect of the voltage doubling capacitor C5. The resistor R5, which is usually of several tens of ohms, is provided for preventing an excessive current in the thyristor SCR caused by the charging current of the voltage doubling capacitor C5.

When the high-level flash emission terminating signal is released from the output terminal 3-2 of the interface circuit 3 (cf. 3-2 in FIG. 4) at the time t3 to turn on the transistor Q2, the gate voltage of the IGBT Ql is shifted to the low level to render the IGBT Ql non-conductive.

Figure 4:
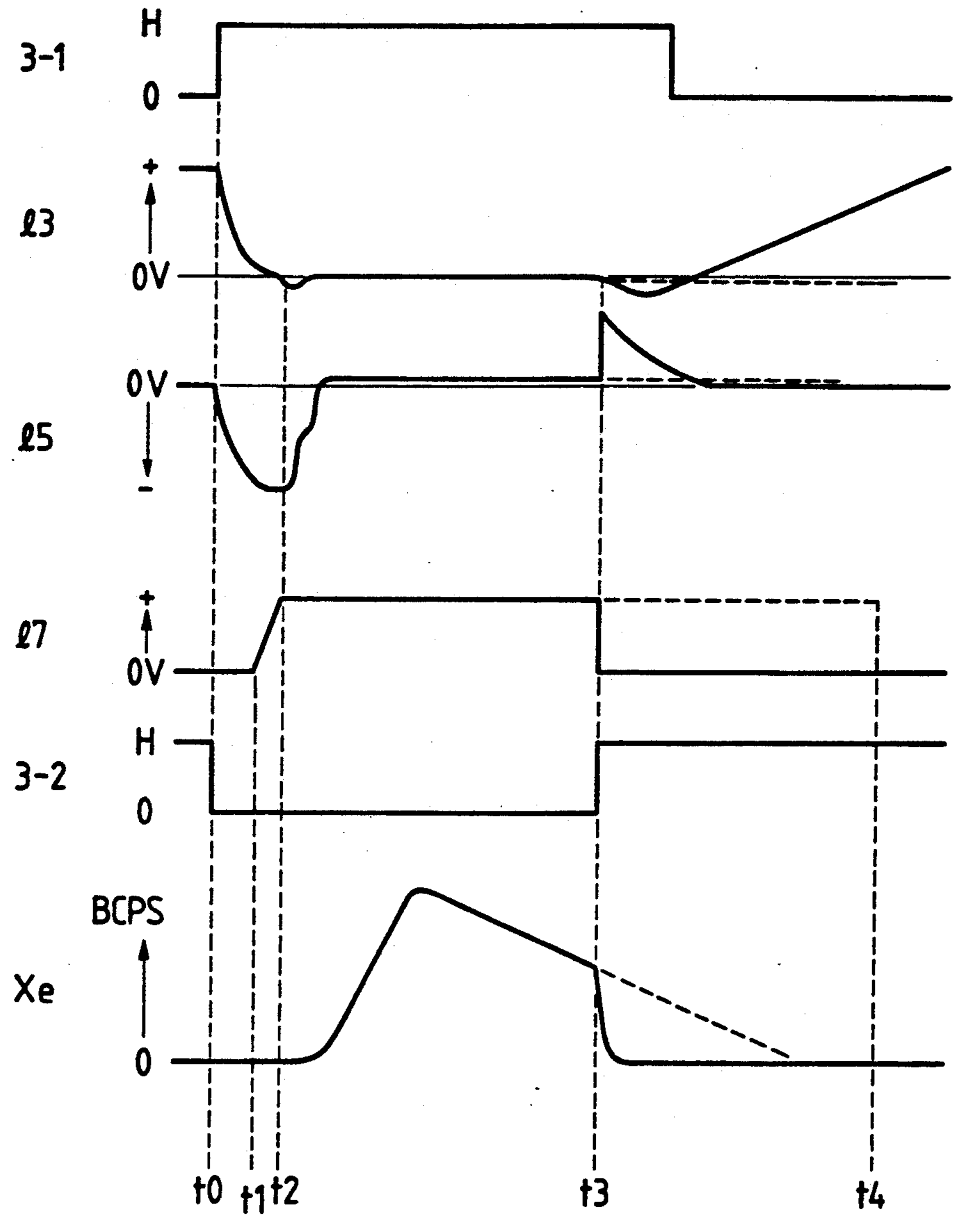
FIG. 4 is a timing chart of the second embodiment.

As shown in FIG. 4, the output 3-1 is at the high level at the time t3, and, if the thyristor SCR is turned on, a part of the flash emission current of the flash discharge tube Xe flows in a circuit consisting of the main capacitor Cl, flash discharge tube Xe, resistor R5, voltage doubling capacitor C5 and thyristor SCR, thereby charging the voltage doubling capacitor C5. The charging is terminated after it is charged to a voltage approximately equal to the remaining voltage $V_{CM}$ in the main capacitor Cl. Consequently the voltage Vl3 of the anode of the thyristor SCR, or the point 13 is approximately equal to:

$$Vl3 = \frac{R6 - R1}{R6 + R1} V_{CM}$$

wherein the resistance of the resistor R5 and the forward voltage of the diode R6 are disregarded. Consequently the thyristor SCR is rendered securely non-conductive, by selecting a condition R1>R6 as $V_{CM}$ becomes negative.

In practice, if the condition R1>R6 is selected, the voltage Vl3 becomes negative in the course of discharge of the voltage doubling capacitor 5 through a loop circuit consisting of the positive electrode of the main capacitor Cl, resistor R1, voltage doubling capacitor C5, resistor R5, diode D6, resistor R6 and negative electrode of the main capacitor Cl. Thus, in the embodiment shown in FIG. 3, the resistance of the resistor R1 is selected larger than that of the resistor R6, in consideration of a fast light control operation (low light amount) in which the flash emission terminating signal 3-2 is released, after the time t2, while the output 3-1 is still at the high level.

The resistor R6 is usually selected in a range of 10 to 50 KΩ in order to prevent the continuation of flash emission from the flash discharge tube Xe through excessively low resistance of the resistor R6 after the IGBT Ql is turned off. The resistance of the resistor R1 is selected, for safety, larger than that of the resistor R6, for example larger than twice of the resistance thereof. Stated differently, the thyristor SCR can be securely turned off if the resistance of the resistor R1 is selected at a value high enough to reduce the current therethrough below the holding current of the thyristor SCR. In case the IGBT Ql is turned off while the output 3-1 is at the low level and the thyristor SCR is in the non-conductive state, the thyristor SCR remains non-conductive without causing any problem.

More specifically in the second embodiment shown in FIG. 3, repeated triggerings as fast as about 30 Hz are possible by selecting the conditions R1=100 KΩ, R6=22 KΩ, R5=22Ω, and C2=C5=0.047 μF.

In FIG. 4, broken lines indicate the state after full flash emission. As in the first embodiment, at the time t4 after the lapse of a predetermined time following the full flash emission, the output 3-2 remains at the high level to maintain the transistor on thereby turning off the IGBT Ql. Thus the gate thereof is biased to the ground level to maintain the IGBT Ql in non-conductive state.

In the second embodiment, the resistor R6 is connected to the junction point 18 between the IGBT Ql and the diode D6, but it may also be connected to the junction point between the flash discharge tube Xe and the anode of the diode D6.

As explained in the foregoing, the second embodiment not only has the same effects as in the first embodiment, but is also capable, as in the conventional technology, of applying a voltage that is double the voltage of the charged voltage of the main capacitor Cl, between the anode and cathode of the flash discharge tube Xe at the triggering thereof, thereby achieving secure triggering operation.

In order to enable a next flash emission after a flash emission, the first embodiment only requires to recharging the trigger capacitor C2 of a relatively small capacity. Also the second embodiment only requires to recharging the voltage doubling capacitor C5 and the trigger capacitor C2 of relatively small capacity, and it is possible to reduce the interval between flash emissions in an operation requiring flash emissions in succession by dividing the energy charged in the main capacitor Cl.

Figure 5:
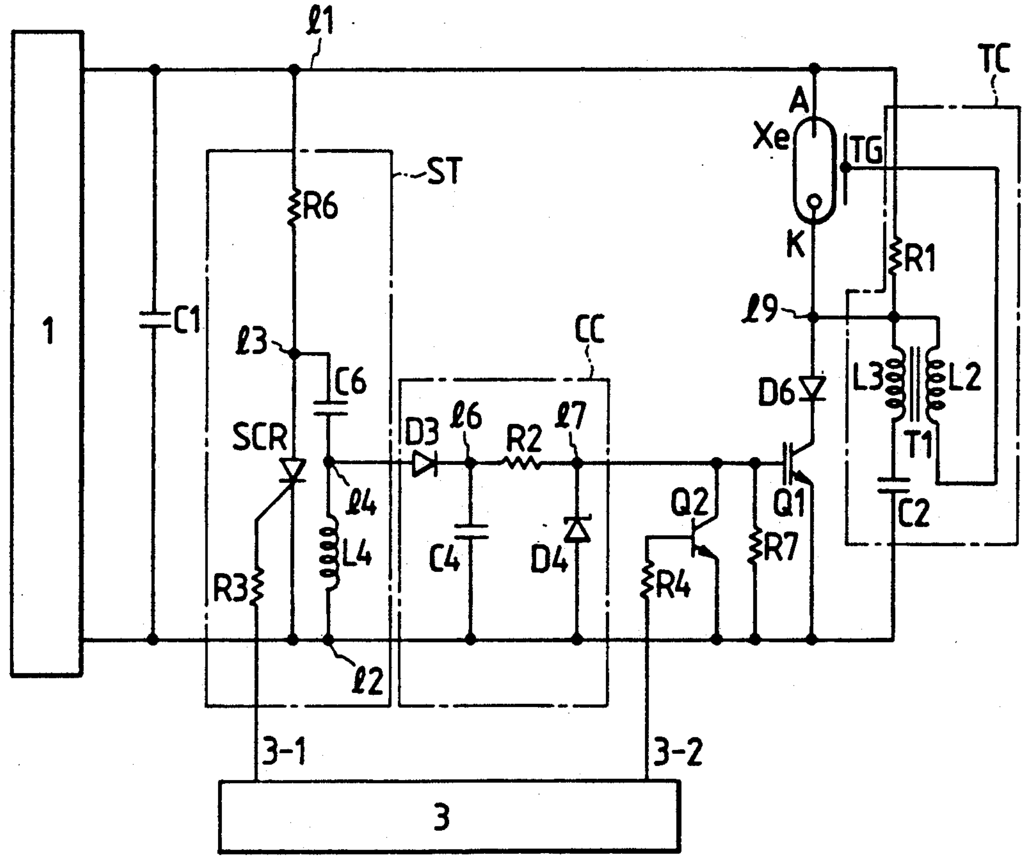
FIG. 5 is a circuit diagram of a third embodiment of the present invention.
Figure 6:
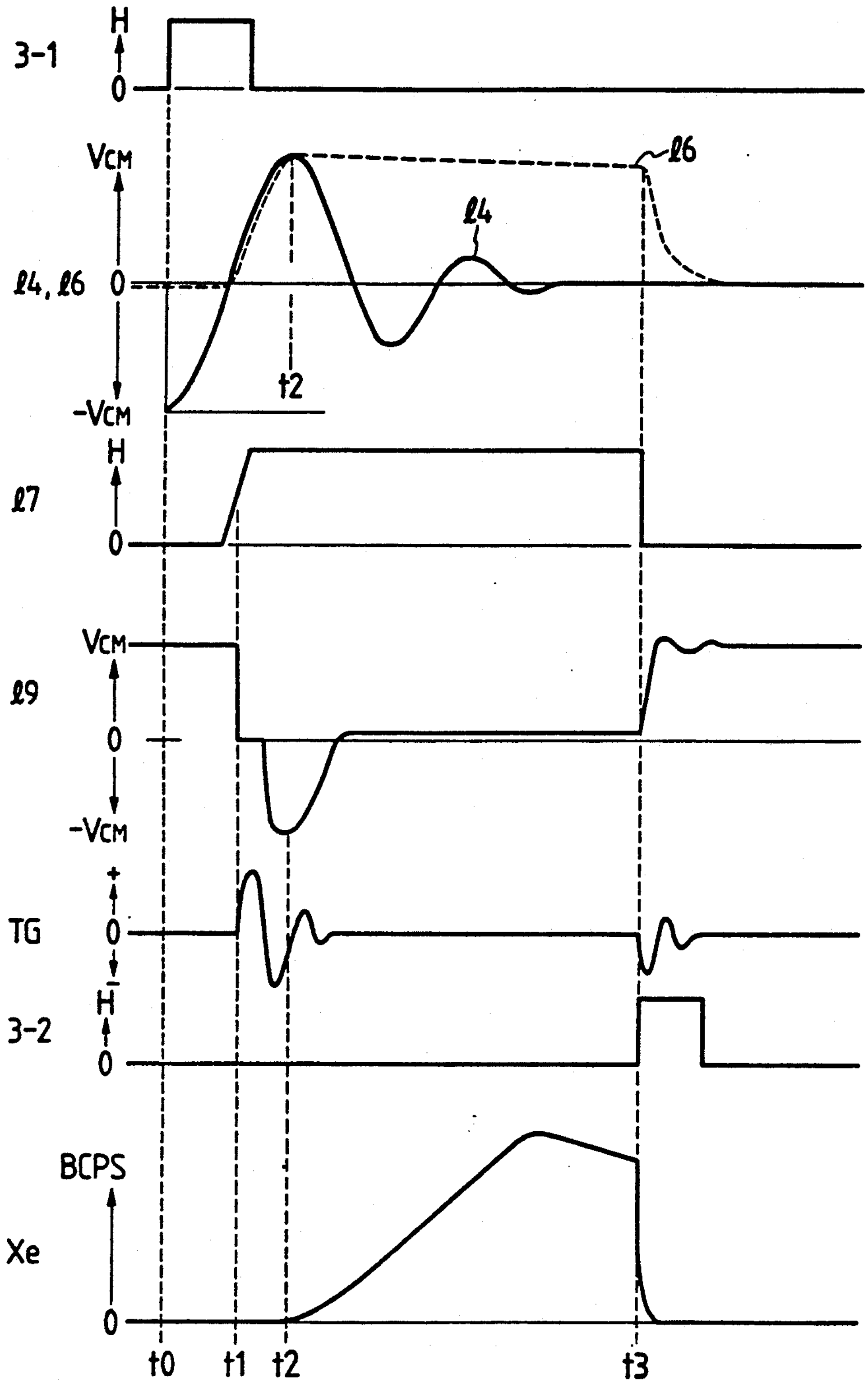
FIGS. 6 and 7 are timing charts of the third embodiment.

Now reference is made to FIGS. 5 and 6 for explaining a third embodiment of the present invention.

Referring to FIG. 5, a power source 1 composed of a DC-DC converter is connected to a low-voltage power source and a power switch (not shown). When the power switch is closed, the DC-DC converter 1 starts the voltage elevating function to supply a high voltage of 200–400 volts between a power supply line l1 and a ground line l2. Between these lines there is connected a main capacitor C1 which is charged to a voltage $V_{CM}$ as the energy for flash emission, by the high voltage from the power source 1.

A starter circuit ST has a resistor R6 and a thyristor SCR (first switching device) serially connected between the power supply line l1 and the ground line l2, and a capacitor C6 and inductor L4 mutually connected serially to constitute an LC resonance circuit and connected parallel to thyristor SCR. The gate of the thyristor SCR is connected, through a resistor R3, to an output terminal 3-1 for the flash emission start command of an interface circuit 3 to be explained later. The capacitor C6 is charged to the charged voltage of the main capacitor Cl, through a circuit consisting of the power supply line l1, resistor R6, capacitor C6, inductor L4 and ground line l2.

Between the power supply line l1 and the ground line l2, there is provided a flash discharge tube Xe and a serially connected insulated gate bipolar transistor (IGBT) Ql constituting a voltage-controlled second switching device. Between tube Xe and the collector of the IGBT Ql, there is provided a diode D6 for passing only the current from the tube Xe to the IGBT. The gate of IGBT Ql is connected to the ground line l2 through a flash emission terminating transistor Q2 and a resistor R7, and the base of transistor Q2 is connected, through a resistor R4, to an output terminal 3-2 for the flash emission terminating signal of the interface circuit 3.

A trigger circuit TC is composed of a resistor R1, a trigger capacitor C2 and a trigger transformer T1, of which secondary coil L2 is connected to a trigger electrode TG and the cathode K of the flash discharge tube Xe. The trigger capacitor C2 and the trigger transformer T1 constitute a second resonance circuit. The trigger capacitor C2 is charged to the charged voltage of the main capacitor Cl, in advance through a circuit consisting of the power supply line l1, resistor R1, primary coil L3 of the trigger transformer T1, trigger capacitor C2 and ground line l2.

A clamping circuit CC is composed of a diode D3, a capacitor C4, a resistor R2 and a Zener diode D4, and serves to hold the peak output voltage of the first LC resonance circuit composed of the capacitor C6 and the inductor L4, by means of the capacitor C4 and to clamp the voltage at a predetermined value, for example 40 V, by the Zener diode D4. The clamped voltage is supplied to the gate of the IGBT Ql.

Also referring to FIG. 5, when the shutter of a camera is released in the flash photographing mode, a synchronization switch is closed whereby the interface circuit 3 releases a high-level flash emission start signal from the output terminal 3-1. Thus the gate of the thyristor SCR of the starter circuit ST is shifted to the high level through the resistor R3, thereby rendering the thyristor SCR conductive. Also the light reflected from the object which is illuminated by the flash emission from the electronic flash apparatus is measured by a photosensor, (not shown) and a high-level flash emission terminating signal is released from an output terminal 3-2 when a predetermined light amount is reached. Thus a current is injected, through the resistor R4, into the base of the flash emission terminating transistor Q2 to render transistor Q2 conductive, whereby the gate of the IGBT Ql is shifted to the low level, thus turning off the IGBT and terminating the flash emission.

In the following the flash emitting function will be explained with reference to a timing chart shown in FIG. 6. It is assumed that the main capacitor C1 and the capacitors C4, C6 are charged in advance.

The high-level flash emission start signal starts at t0 (3-1 in FIG. 6) to turn on the thyristor SCR, whereby the capacitor C6 starts rapid discharge and the potential of the line l4 (l4 in FIG. 6) is at once lowered to $-V_{CM}$. The discharge current of the capacitor C6 flows in a closed loop of the inductor L4 and capacitor C6 through the thyristor SCR, whereby the first LC resonance circuit of the inductor L4 and the capacitor C6 initiates an attenuating oscillation (l4 in FIGS. 5 and 6), with a frequency:

$$f = \frac{1}{2\pi\sqrt{L4 \cdot C6}}$$

wherein

L4 : inductance of inductor L4

C6 : capacity of capacitor C6.

The thyristor SCR turned on at t0 remains conductive for a half period to the time t2 when the voltage at the point l3 becomes negative ($t2-t0=\pi\sqrt{L4\cdot C6}$), and, after the time t2, is turned off, the potential of the anode of the thyristor SCR (potential at l3 in FIG. 5) being reduced approximately to $-V_{CM}$.

The potential of the point l4 starts from $-V_{CM}$ at t0, then returns approximately to $V_{CM}$ at t2 and repeats attenuating oscillation. The voltage appearing at the point l4 is subjected to peak holding in the capacitor C4 through the diode D3, and the voltage V3 of the point l6 approaches to the voltage V4 at the point l4. According to the experience of the present inventors, the voltage V3 can be as high as ½ to ⅔ of $V_{CM}$.

Thus the capacitor C4 is charged approximately to $V_{CM}$, as shown in by l6 FIG. 6, in a period t1−t2. Under the conditions $L4=5\ \mu H$ and $C6=0.047\ \mu F$, the period t2−t0 is about 1.5 μsec., so that the capacitor C4 can be instantaneously charged.

The charge in capacitor C4 flows through the resistor R2 to the Zener diode D4, thus generating a Zener voltage of several tens of volts at the cathode after "6" insert l7 as shown in FIG. 6. The Zener voltage is supplied to the gate of the IGBT Ql, thus rendering the IGBT conductive. Consequently the IGBT Ql is maintained conductive in the period t1−t2.

From the start of conduction of the IGBT to the flow of discharge current of the flash discharge tube Xe, the on-state resistance of the IGBT has to be sufficiently lowered. Since the gate of the IGBT generally has a gate capacity of several thousand pF, it is necessary to rapidly charge the gate capacity and to achieve the conductive state of the IGBT within a short time, so that the resistance of the resistor R2 is selected at a relatively low value, such as several hundred ohms to several thousand ohms.

When the IGBT Ql is rendered conductive, the trigger capacitor C2 is discharged through a loop circuit consisting of the trigger capacitor C2, primary coil L3 of the trigger transformer T1, line l9, diode D6, IGBT Ql and line l2. In the course of this discharge, an oscillation is induced because the trigger capacitor C2 and the primary coil L3 of the trigger transformer T1 constitute the second LC resonance circuit. Since the discharge loop circuit contains the diode D6, the trigger capacitor C2 changes polarity at the ½ cycle of the LC oscillation, whereby the line l9 finally reaches $-V_{CM}$ at t2 (l9 in FIG. 6). Consequently a high voltage of about twice the charged voltage $V_{CM}$ of the main capacitor C1 is applied between the anode and cathode of the flash discharge tube Xe, thereby facilitating the flash emission therefrom. Consequently the trigger capacitor C2 functions also as the known voltage doubling capacitor. The diode D6 is provided because, in the IGBT Ql, the collector potential cannot be made lower than the emitter potential because of the property of the device.

As explained above, the aforementioned high voltage is applied to the trigger electrode TG of the flash discharge tube Xe and a high voltage of about $2V_{CM}$ is applied between the anode and cathode of tube Xe at the time t2 shown in FIG. 6, whereby the tube Xe starts flash emission (Xe in FIG. 6).

At a time t3, the output terminal 3-2 of the interface circuit 3 releases a high-level flash emission terminating signal (3-2 in FIG. 6), thereby turning on the transistor Q2 to shift the Zener voltage, or the gate voltage of the IGBT Ql, to zero, whereby the IGBT is immediately turned off and the flash discharge tube Xe terminates the flash emission. Also the capacitor C4 is discharged through the resistor R2 and the transistor Q2 whereby the lines l6, l7 are brought to zero volt. Thereafter the gate of the IGBT Ql is pulled down to zero volt by the resistor R7, in order to prevent unexpected function of the IGBT.

At a time t3 when the light control operation is conducted, a part of flash emission current rapidly charges the trigger capacitor C2 to the remaining voltage of the main capacitor C1 through the primary coil L3 of the trigger transformer T1 (l9 in FIG. 6), whereby the trigger capacitor C2 is prepared for the next flash emission. Since trigger capacitor C2 is of a very small capacity, the light emission induced at its charging is very small and does not affect the light amount providing the appropriate exposure. Also the charging current generates, on the secondary coil L2 of the trigger transformer T1, a high voltage which is applied to the trigger electrode TG of the flash discharge tube Xe, but the flash emission is not triggered in the tube Xe because the IGBT Ql is deactivated.

In the foregoing there has been explained the operation when the flash emission terminating signal is released from the interface circuit 3. On the other hand, when the flash discharge tube Xe provides full flash emission without the terminating signal, the transistor Q2 is not turned on and the charge in the main capacitor C1 is fully discharged while the voltage from the clamping circuit CC is supplied to the gate of the IGBT Ql. In this case the capacitor C4 is discharged through the resistors R2, R7, and the capacity of capacitor C4 and the resistances of the resistors R2, R7 are so determined that the gate voltage of the IGBT is shifted to the low level to turn off the IGBT after the completion of flash emission from the flash discharge tube Xe, or when the flash emission current becomes almost zero.

Referring to FIG. 6, the time t1 is about 1 microsecond, t2 is about 2 microseconds, and t3 is several tens of microseconds to several milliseconds, counting from the time t0.

In the following there will be explained selection of circuit constants for enabling rapid repeated flash emission in the present embodiment.

In order to repeat the flash emissions at a high frequency, it is necessary to re-charge the capacitors C2, C6 as rapidly as possible. There is no difficulty with the trigger capacitor C2, as it can be instantaneously charged by the flash emission current when the flash emission is terminated. The re-charging of the capacitor C6 can be made faster if the resistance of the charging resistor R6 is made smaller, but the thyristor SCR may remain in the conductive state even after the gate voltage is turned off, if the resistance is made so small that the current therethrough exceeds the holding current of the thyristor SCR. However, in the present embodiment, the resistance of the resistor R6 can be made sufficiently small under the following conditions, since an LC resonance circuit is provided parallel to the thyristor SCR and the thyristor SCR is turned off when the anode thereof assumes a negative potential by the LC resonance.

Figure 7:
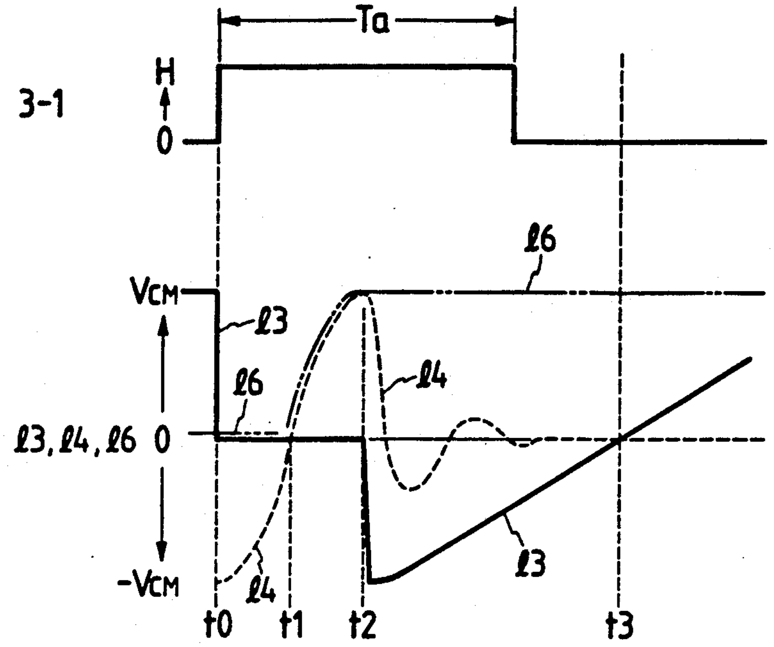

More specifically, the resistance of the resistor R6 can be made sufficiently small if the gate voltage of the thyristor SCR, namely the flash emission start signal, is shifted down while the anode of the thyristor SCR is at a negative potential. Therefore the turn-on time of the flash emission start signal is determined in the following manner. The voltages of the lines l3, l4 and l6 shown in FIG. 5 vary as shown in FIG. 7. In response to the shift of the flash emission start signal, applied to the gate, from the low level to the high level at time t0, the thyristor SCR is rendered conductive whereby the line l3 shifts from $V_{CM}$ to 0 V while the line l4 shifts from 0 V to $-V_{CM}$. Also in response to the conduction of the thyristor SCR, the first resonance circuit consisting of the capacitor C6 and the inductor L4 causes an attenuating oscillation as explained before, and a peak voltage appears on the line l6 in the first half cycle t0−t2. As the thyristor SCR remains conductive in the period t0−t2, the line l3 remains at about 0 V. After the time t2, since the current in the LC resonance circuit is inverted, the line l3 assumes a negative potential (about $-V_{CM}$), so that the thyristor SCR is rendered non-conductive even though the gate thereof is at the high level. After the time t2, the capacitor C6 is re-charged through a circuit consisting of the resistor R6, capacitor C6 and inductor L4, whereby the potential at the anode l3 of the thyristor SCR (l3) shifts from negative to positive at the time t3.

Thus, at the time t3, after the completion of light control operation of the electronic flash apparatus, the potential at the anode l3 of the thyristor SCR (l3) shifts from negative to positive. At this point, if the gate voltage of the thyristor SCR is at the high level while the remaining voltage of the main capacitor C1 is high and the resistance of the resistor R6 is low, the thyristor SCR is given a current exceeding the holding current and remains conductive, so that the flash emission cannot be repeated In order to prevent such drawback, therefore, it is necessary to return the flash emission start signal to the low level prior to the time t3, when the anode voltage of the thyristor SCR moves to positive.

The time t3−t0 required for the anode voltage of the line l3 to shift to positive can be defined as follows:

$$t2 - t0 = \pi\sqrt{L4 \times C6}$$
$$t3 - t2 = C6 \times R6 \times \ln 2$$

wherein C6 is the capacity of the capacitor C6 and R6 is the resistance of the resistor R6, and the charged voltage $V_{CM}$ of the main capacitor C1 is assumed not to change immediately after the flash emission. Consequently:

$$t3 - t0 = \pi\sqrt{L4 \times C6} + C6 \times R6 \times \ln 2$$

Since t2−t0 is shorter than t3−t2 under usual selection of circuit constants, there approximately stands:

$$t3 - t0 \approx t3 - t2$$

so that $$t3 - t0 = C6 \times R6 \times \ln\frac{2V1}{V1} = C6 \times R6 \times \ln 2$$

For example, t3−t0 is about 3.26 msec. under conditions C6=0.047 μF and R6=100 KΩ. Thus, after the start of flash emission at t0, the flash emission start signal should be shifted down prior to the lapse of 3.26 msec. This is not difficult to achieve in practice, since the flash emission start signal can be as short as about 10 μsec. Also repeated triggerings as fast as about 100 Hz are possible with the abovementioned values of C6 and R6.

In the following there will be explained a fourth embodiment of the electronic flash apparatus of the present invention, with reference to FIG. 8.

Figure 8:
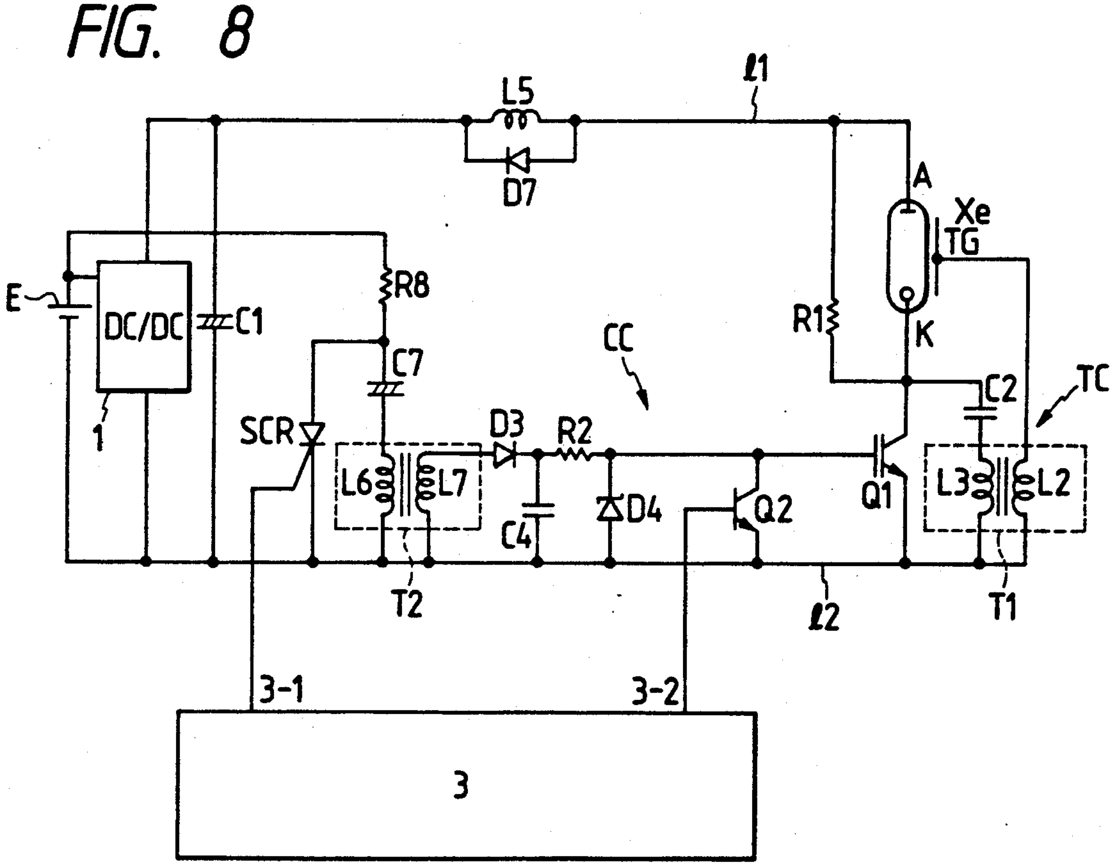
FIG. 8 is a circuit diagram of a fourth embodiment of the present invention.

In FIG. 8, there are shown a low-voltage power source E such as a battery, and a DC-DC converter 1 for supplying a high voltage. When a power switch (not shown) is closed, the DC-DC converter 1 starts a voltage elevating operation to generate a high voltage of 200–400 volts between a power supply line l1 and a ground line l2. Between these lines there is provided a main capacitor Cl, which is charged by the high voltage, for the energy for flash emission.

Also between these lines there are serially connected a flash discharge tube Xe and an insulated gate bipolar transistor (IGBT) serving as a voltage-controlled second switching device Ql. In the power supply line l1 between the anode of the main capacitor C1 and that A of the flash discharge tube Xe, there are inserted an inductor L5 for suppressing the start of the flash emission current (and minimizing overexposure due to a delay in the light metering system etc. in case of controlling a small light amount), and a diode D7 for absorbing the inverse voltage generated in the inductor. The gate of the IGBT Ql is connected to the ground line l2 through a flash emission terminating transistor Q2, of which the base is connected to the output terminal 3-2 of an interface circuit 3.

Between the positive pole of the low-voltage power source E and the ground line l2, there are serially connected a resistor R8 and a thyristor SCR (first switching device), and a serial circuit of a capacitor C7 and the primary coil L6 of a transformer T2 is connected parallel to thyristor SCR, of which the gate is connected to the output terminal 3-1 of an interface circuit 3 to be explained later. The capacitor C7 is charged to the voltage of the power source E, through a circuit consisting of the power source E, resistor R8, capacitor C7, primary coil L6 of the transformer T2 and ground line l2.

A trigger circuit TC is composed of a resistor R1, a trigger capacitor C2 and a trigger transformer T1, of which secondary coil L2 is connected, respectively, to a trigger electrode TG of the flash discharge tube Xe and the ground line l2. The trigger capacitor C2 is charged in advance to the charged voltage of the main capacitor Cl, through a circuit consisting of the power supply line l1, resistor Rl trigger capacitor C2, primary coil L3 of the trigger transformer T1 and ground line l2.

A clamping circuit CC is composed of a diode D3, a capacitor C4, a resistor R2 and a Zener diode D4, and serves to hold the peak value of the output voltage of the transformer T2 by the capacitor C4 and to clamp it by the Zener diode D4 at a predetermined value, for example 40 V. The clamped voltage is supplied to the gate of the IGBT Ql. The driving voltage of the IGBT Ql is preferably raised close to the maximum nominal value, and the clamped voltage is securely lower than the maximum nominal value and protects the IGBT Ql.

When the shutter of the camera is released in the flash photographing mode, a synchronization switch (not shown) is closed and the interface circuit 3 shown in FIG. 8 releases a high-level flash emission start signal from the output terminal 3-1. Thus the gate of the thyristor SCR is shifted to the high level to render the thyristor SCR conductive. Also the light reflected from the object illuminated by the flash emission from the electronic flash apparatus is measured by a unrepresented photosensor, (not shown) and a high-level flash emission terminating signal is released from the output terminal 3-2 when a predetermined light amount is reached. Thus a current is injected to the base of the flash emission terminating transistor Q2 to render the transistor conductive, thereby shifting the gate of the IGBT Q1 to the low level and turning off the IGBT, thus terminating the flash emission.

The electronic flash apparatus explained above functions in the following manner. It is assumed that the capacitors Cl, C2 and C7 are charged in advance.

In response to the start of the high-level flash emission start signal, the thyristor SCR is rendered conductive whereby the capacitor C7 starts rapid discharge. The discharge current of capacitor C7 flows in a closed loop circuit consisting of the thyristor SCR and the primary coil L6 of the transformer T2, whereby a current is generated in the secondary coil L7 of the transformer T2, is by the diode D3 and charges the capacitor C4.

The charge in the capacitor C4 flows to the Zener diode D4 through the resistor R2, thereby generating a Zener voltage at the cathode of the Zener diode D4. The Zener voltage is applied to the gate of the IGBT Ql, thereby turning on the IGBT.

After the start of conduction of the IGBT Ql, it is necessary to sufficiently lower the on-state resistance of the IGBT Ql before the flash emission current of the flash discharge tube Xe starts to flow in the IGBT. Since the gate of the IGBT usually has a gate capacity of several thousand pF, it is necessary to rapidly charge the gate capacity, thereby shifting the IGBT to the conductive state within a short time. For this purpose the resistance of the resistor R2 is selected at a relative low value, for example several hundred ohms to several thousand ohms.

According to the experience of the present inventors, by selecting conditions $C7=0.047\ \mu F$, $C4=0.01\ \mu F$ and $R2=1000\Omega$, the gate voltage of the IGBT can be raised to 30 V or higher within 10 μsec. after the activation of the thyristor SCR.

When the IGBT is rendered conductive, the trigger capacitor C2 is discharged through a loop circuit consisting of IGBT Q1, ground line 12, primary coil L3 of the trigger transformer T1 and trigger capacitor C2, thereby generating, in the secondary coil L2 of the trigger transformer T1, a trigger voltage which is applied to the trigger electrode TG of the flash discharge tube Xe. In this state, the on state resistance of the IGBT is low if the gate voltage is sufficiently elevated, so that the flash discharge tube Xe starts flash emission.

When the high-level flash emission terminating signal is released from the output terminal 3-2 of the interface circuit 3, the transistor Q2 is rendered conductive thereby reducing the Zener voltage, or the gate voltage of the IGBT Ql, to zero. Thus the IGBT Ql is instantaneously turned off, whereby the flash discharge tube Xe terminates the flash emission due to the interruption of the discharge loop. Also the capacitor C4 is discharged through the resistor R2 and the transistor Q2.

The flash emission terminating signal is maintained at the high level until the next flash emission start signal is released, whereby the transistor Q2 is maintained in the on-state to pull the gate potential of the IGBT Ql down to zero, thereby preventing unexpected operation of the IGBT Ql.

In the foregoing there has been explained the operation when the flash emission terminating signal is released from the interface circuit 3. On the other hand, in case full flash emission is given by the flash discharge tube Xe without the flash emission terminating signal, the transistor Q2 is not turned on and the entire charge of the main capacitor C1 is discharged while the voltage from the clamping circuit CC remains applied to the gate of the IGBT Ql. In this case the capacitor C4 is discharged through the resistor R2 and the transistor Q2, and the time constant determined by the capacity of the capacitor C4 and the resistance of the resistor R2 is so determined that the gate voltage of the IGBT Q1 is shifted to the low level to deactivate the IGBT Q1 after the completion of flash emission of the flash discharge tube Xe or when the flash emission current becomes almost zero.

Figure 9:
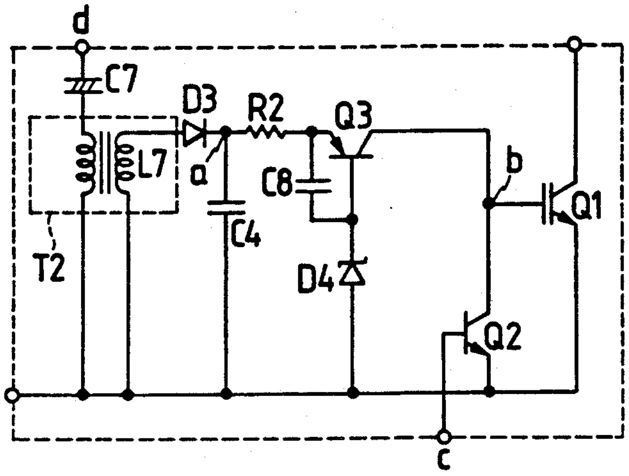
FIG. 9 is a circuit diagram of a fifth embodiment the present invention.

FIG. 9 shows a fifth embodiment of the present invention, the same components as those in FIG. 8 are represented by the same symbols.

Between the resistor R2 and the gate of the IGBT Ql, there is inserted a PNP transistor Q3, of which the gate is connected the cathode of a Zener diode D4. Also between the emitter and the gate of the PNP transistor Q3, there is connected a capacitor C8 for absorbing noise, in order to prevent erroneous turning-on of the PNP transistor Q3.

In the following there will be explained the operation of the fifth embodiment, with reference to a timing chart shown in FIG. 10.

When the flash emission terminating signal is shifted down (c in FIG. 10) at time t0 simultaneously with the upshift of the flash emission start signal, the transistor Q2 is turned off. At the same time the thyristor SCR shown in FIG. 8 is rendered conductive to discharge the capacitor C7 as shown by d in FIG. 10, whereby a current is induced in the secondary coil L7 of the transformer T2. Consequently the charging of the capacitor C4 is started (a in FIG. 10), and a current starts to flow at t1 in the resistor R2, emitter and base of the PNP transistor Q3, and Zener diode D4 whereby the PNP transistor is turned on. Since the capacitor C4 is already charged, the charged voltage thereof is rapidly applied to the gate of the IGBT Ql as shown in b in FIG. 10. The period between t0 and t1 is about 10 μsec., and such delay from the flash emission start signal is tolerable in practice. Since the gate voltage of the IGBT Ql rises rapidly, the IGBT Ql does not control the flash emission current in the activated range thereof, so that there can be prevented the destruction resulting from a loss exceeding the tolerable limit. Also when the voltage of the capacitor C4 does not rise sufficiently, a similar effect can be obtained since no voltage is applied to the gate of the IGBT Ql.

Figure 10:
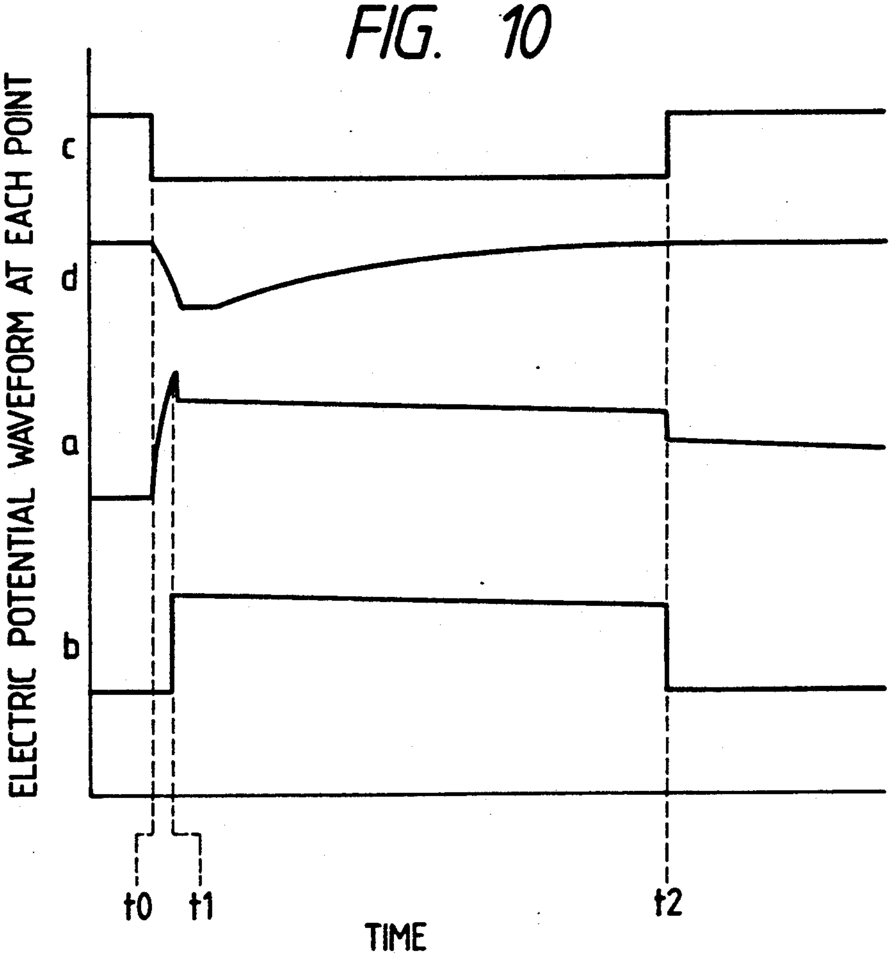
FIG. 10 is a timing chart of the fifth embodiment.

When the flash emission terminating signal rises again at t2 as shown by c in FIG. 10, the transistor Q2 is made conductive to connect the gate of the IGBT Ql to the ground line 12, thereby turning off the IGBT Ql and terminating the flash emission.

In the above-explained fifth embodiment, the IGBT Ql can be safely driven since the Zener diode D4 and the transistor Q3 respectively serve as the upper and lower limiters therefor.

In the foregoing embodiments there has been employed an IGBT, but there may be employed other devices of which conductive and non-conductive states can be controlled by a voltage supplied to a control terminal, such as a power MOSFET (metal oxide semiconductor field effect transistor) or a SIT (static induction transistor).

In the present invention, a first LC resonance circuit, composed of the capacitor C6 charged at the charging of the main capacitor C1 and the inductor L4, is provided between the power supply line l1 and the ground line l2 and is put into oscillation in synchronization with the flash emission start command, and the voltage of the LC resonance circuit is clamped, by the clamping circuit CC, to the driving voltage of the flash emission switching device Ql and is supplied to the control terminal thereof. Consequently there is not required a particular driving power source, and the cost and space therefor can be dispensed with. Since the LC resonance circuit has no DC current consumption in the stand-by state, the charge of the main capacitor C1 is not wasted. Also in a structure in which the charging function of the voltage elevating circuit is terminated after the completion of charging of the main capacitor Cl and the charge therein is conserved for a long time in the stand-by state, the driving voltage can be immediately applied to the flash emission switching device Ql, without causing delay in the flash emission.

Also in the present invention, the same effects can be obtained by employing, instead of the aforementioned LC resonance circuit, a structure in which the precharged capacitor C7 is discharged in synchronization with the flash emission start command to give a discharge current in the primary coil L6 of the transformer T2 thereby generating a secondary voltage, and the secondary voltage is utilized in the clamping circuit for generating the control voltage for supply to the control terminal of a voltage-controlled switching device Ql such as an IGBT.

In the present invention, in addition to the foregoing, a second LC resonance circuit, composed of the trigger capacitor C2 and the primary coil L3 of the trigger transformer T1, is connected parallel to the flash emission switching device Ql, and a one-directional conduction device D6 is provided for separating the negative voltage of oscillation of the second LC resonance circuit from the power supply terminal of the switching device Ql, so that a high voltage of about twice the voltage of the main capacitor C1 can be applied between the anode and cathode of the flash discharge tube as in the conventional technology, even when a voltage-controlled switching device Ql is employed.

The present invention is not limited to the foregoing embodiments but is subject to various modifications and alterations within the scope and spirit of the appended claims.

What is claimed is:

1. An electronic flash apparatus comprising:
a flash discharge tube;
a main capacitor;
first switching means adapted to produce an oscilating voltage in response to a flash emission start command, said first switching means having an LC resonance circuit which comprises an LC resonance coil and an LC resonance capacitor and which is adapted to oscillate in response to said flash emission start command;
charging means for charging said main capacitor and said LC resonance capacitor;
second switching means for controlling the start and termination of flash emission of said flash discharge tube, said second switching means having a voltage-controlled switching device which selectively switches to a conductive state or a non-conductive state according to a voltage applied thereto, said voltage-controlled switching device being connected in a discharge loop of said main capacitor through said flash discharge tube; and
clamping means for clamping the oscillating voltage produced by said first switching means at a value suitable for causing the conductive state of said voltage-controlled switching device and for applying the clamped voltage thereto.

2. An electronic flash apparatus as claimed in claim 1, wherein said first switching means has means for applying a trigger voltage to said flash discharge tube.

3. An electronic flash apparatus as claimed in claim 1, wherein said first switching means has a transformer in which said LC resonance coil is a primary coil and is connected in a discharge loop of said LC resonance capacitor, and wherein said transformer has a secondary coil connected to apply a trigger voltage to said flash discharge tube.

4. An electronic flash apparatus as claimed in claim 1, further comprising a trigger transformer and a trigger capacitor that is charged by said charging means, said trigger transformer having a primary coil which forms another LC resonance circuit with said trigger capacitor, the last-mentioned LC resonance circuit being connected to discharge said trigger capacitor through said voltage-controlled switching device, said trigger transformer having a secondary coil connected to apply a trigger voltage to said flash discharge tube.

5. An electronic flash apparatus as claimed in claim 4, wherein said discharge loop of said main capacitor includes a one-directional conductive device connected in series with said flash discharge tube and said voltage-controlled switching device, and wherein the last-mentioned LC resonance circuit is a series circuit connected across said one-directional conductive device and said voltage-controlled switching device so as substantially to increase a voltage across said flash discharge tube when said trigger voltage is applied thereto.

6. An electronic flash apparatus as claimed in claim 1, further comprising control means for inhibiting the charging of the main capacitor by said charging means when said main capacitor is charged to a predetermined voltage.

7. An electronic flash apparatus comprising:
a flash discharge tube;
a main capacitor;
first switching means adapted to produce an oscillating voltage in response to a flash emission start command, said first switching means having an LC resonance circuit which comprises an LC resonance coil and an LC resonance capacitor and which is adapted to oscillate in response to said flash emission start command;
means for charging said main capacitor and said LC resonance capacitor;
trigger means including a trigger transformer in which said LC resonance coil is a primary coil, said trigger transformer having a secondary coil connected to apply a trigger voltage to said flash discharge tube;
second switching means for controlling the start and termination of flash emission of said flash discharge tube, said second switching means having a voltage-controlled switching device which selectively switches to a conductive state or a non-conductive state according to a voltage applied thereto, said voltage-controlled switching device being connected in a discharge loop of said main capacitor through said flash discharge tube; and clamping means for clamping the oscillating voltage produced by said first switching means at a value suitable for causing the conductive state of said voltage-controlled switching device and for applying the clamped voltage thereto.

8. An electronic flash apparatus as claimed in claim 7, further comprising control means for inhibiting the charging of the main capacitor by said charging means when said main capacitor is charged to a predetermined voltage.

9. An electronic flash apparatus as claimed in claim 7, wherein said discharge loop of said main capacitor includes a one-directional conductive device connected in series with said flash discharge tube and said voltage-controlled switching device.

10. An electronic flash apparatus as claimed in claim 9, wherein said secondary coil of said trigger transformer has a first terminal connected to a junction between said flash discharge tube and said one-directional conductive device and has a second terminal connected to a trigger electrode of said flash discharge tube.

* * * * *